(12) United States Patent
Wilhelm et al.

(10) Patent No.: US 9,720,946 B2
(45) Date of Patent: Aug. 1, 2017

(54) EFFICIENT STORAGE OF RELATED SPARSE DATA IN A SEARCH INDEX

(71) Applicant: Microsoft Corporation, Redmond, WA (US)

(72) Inventors: Ryan Wilhelm, Kirkland, WA (US); Øystein Torbjørnsen, Tromso (NO); Sowmy Srinivasan, Redmond, WA (US); Christopher Heino, Jr., Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 274 days.

(21) Appl. No.: 14/523,241

(22) Filed: Oct. 24, 2014

(65) Prior Publication Data

US 2015/0370840 A1    Dec. 24, 2015

Related U.S. Application Data (60) Provisional application No. 62/014,658, filed on Jun. 19, 2014.

(51) Int. Cl.
*G06F 17/30* (2006.01)

(52) U.S. Cl.
CPC .. *G06F 17/30324* (2013.01); *G06F 17/30321* (2013.01); *G06F 17/30448* (2013.01)

(58) Field of Classification Search
CPC ......... G06F 17/30324; G06F 17/30321; G06F 17/30448

USPC ......................................................... 707/744
See application file for complete search history.

(56) References Cited

U.S. PATENT DOCUMENTS

| 5,649,181 A | 7/1997 | French et al. |
|---|---|---|
| 2010/0030796 A1 | 2/2010 | Netz et al. |
| 2012/0269432 A1 | 10/2012 | Wang et al. |
| 2014/0324881 A1* | 10/2014 | Ransil et al. ................. 707/741 |

OTHER PUBLICATIONS

Peerapon Vateekul et al., A conflict-based confidence measure for associative classification, 2008, IEEE, 256-261.*
"International Search Report & Written Opinion Received for PCT Application No. PCT/US2015/036113", Mailed Date: Sep. 4, 2015, 12 Pages.

* cited by examiner

*Primary Examiner* — Jean B Fleurantin
(74) *Attorney, Agent, or Firm* — Turk IP Law, LLC (57) ABSTRACT

Sparse data may be stored in a search index such that one or more data points related to a number of entities may be queriable. Upon detection of a data point related to an entity, an integer array may be created for the data point to store within a single column of the search index, the integer array including an identifier of the entity and a value associated with the data point. In response to receiving a request from a user to perform a query on the search index that includes the data point, the query may be transformed to a corresponding range based on the identifier of the entity. Upon execution of the query, the identifier may be removed and query results may be provided to the user as another array with a user-compatible identifier for the entity such that the results may be understood by the user.

15 Claims, 6 Drawing Sheets

EFFICIENT STORAGE OF RELATED SPARSE DATA IN A SEARCH INDEX

CROSS-REFERENCE TO RELATED APPLICATIONS

This Application claims priority to U.S. Provisional Application Ser. No. 62/014,658 filed on Jun. 19, 2014. The Provisional Application is herein incorporated by reference in its entirety.

BACKGROUND OF THE INVENTION

System data may be stored in a search index such that it may be queried by one or more users, where some of the data may be sparse, such as sensitive data related to credit card numbers, social security numbers, and account numbers, for example. Sparse data may include one or more distinct data points each related to an entity, where the distinct data points may need to be queriable in the search index. Implementing current techniques, two columns may be created in the search index for every entity of the system to accommodate for a match count and a match confidence value of a data point related to the entity. However, many of these entities may not have a corresponding data point within the search index. As a result, the search index may include a high percentage of columns for a very small amount of data, as only about 1-2% of the entities in the search index will have a corresponding data point within the search index, and each additional column created in the index may negatively impact a performance and capacity of the system.

Accordingly, current implementations for storage of related sparse data within a search index could use improvements and/or alternative or additional solutions such that the distinct data points may be stored such that they are queriable by a user without affecting the performance and capacity of the system.

BRIEF SUMMARY OF THE INVENTION

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to the storage of related sparse data within a search index. An example method may include detecting sparse data within content to be indexed, the sparse data comprising a data point related to an entity; creating an integer array for the data point to store within the search index, the integer array comprising an identifier of the entity and a value associated with the data point; in response to receiving a request from a user to perform a query on the search index that includes the data point, transforming the query to a corresponding range based on the identifier of the entity; and upon execution of the query, providing query results to the user These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, system data to be stored in a search index may include sparse data, such as sensitive data. Sparse data may include one or more distinct data points each related to an entity, where the distinct data points may need to be queriable in the search index. The data points may include integer types that support standard integer operations (for example, equals, not equals, greater than, and less than). Accordingly, upon detection of a data point related to an entity within content to be indexed, an integer array may be created for the data point to store within the search index, where the integer array may include an identifier of the entity and a value associated with the data point. In some examples, the integer array for the data point may be stored in a single column of the search index. In response to receiving a request from a user to perform a query on the search index that includes the data point, the query may be transformed to a corresponding range based on the identifier of the entity. Upon execution of the query, the identifier of the entity may be removed and query results may be provided to the user as another array with a user-compatible identifier for the entity such that the results may be understood by the user.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for storage of related sparse data within a search index. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
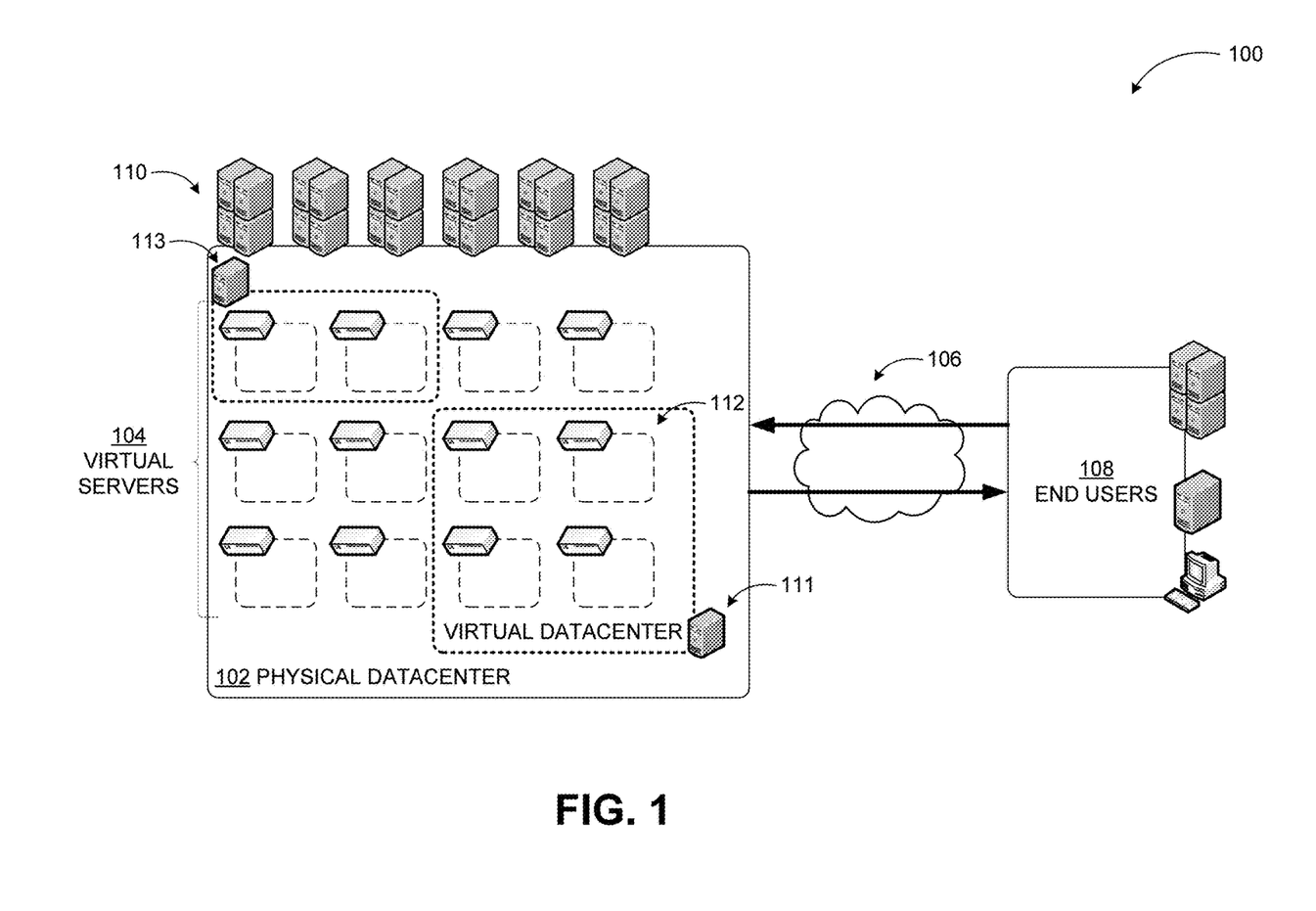
FIG. 1 includes a conceptual diagram illustrating an example datacenter-based system where storage of related sparse data within a search index may be implemented.

FIG. 1 includes a conceptual diagram illustrating an example datacenter-based system where storage of related sparse data within a search index may be implemented.

As shown in a diagram 100, a datacenter 102 may include one or more servers 110, 111, and 113 that are physical servers associated with software and underlying hardware of the datacenter 102. The one or more servers 110, 111, and 113 may be configured to execute one or more virtual servers 104. For example, the servers 111 and 113 may be configured to provide four virtual servers and two virtual servers, respectively. In some embodiments, one or more virtual servers may be combined into one or more virtual datacenters. For example, the four virtual servers provided by the servers 111 may be combined into a virtual datacenter 112. The virtual servers 104 and/or the virtual datacenter 112 may be configured to host a multitude of servers to provide cloud-related data/computing services such as various applications, data storage, data processing, or comparable ones to one or more end users 108, such as individual users or enterprise customers, via a cloud 106.

As previously discussed, sparse data comprising one or more distinct data points for a number of related entities may need to be stored within content of a search index such that the data points are queriable. Existing systems for the storage of sparse data within search indices may create 2 columns in the search index for every entity built into the system to support a count column and a confidence column for a data point related to the entity. However, only between about 1% and 2% of the search index content may contain sparse data associated data points, and the data points may be related to just a few entities within the system causing a large number of the columns to display null values. In an example scenario, there may be 51 entities built within the search index and thus, there may need to be minimum of 102 columns created (51 entities*2 columns/entity). In order to support custom customer built entities, there may be a need to have another 2n columns, where n is the number of custom entities supported (as an example, to support the included 51 entities and 100 custom entities, 302 columns may be needed in the index). A higher number of columns in the target search index may result in a high percentage of columns in the index for a very small amount of sparse data (i.e., the 1-2% of content in the search index), and each new column created in the index may negatively impact performance and capacity of the system.

According to embodiments, the datacenter 102 may be hosting a cloud application that processes/stores data. A search index may be created for the data such that it may be queried by one or more users, and in some cases, the data to be indexed may be sparse. At least one of the servers of the datacenter 102 may be configured to execute a classification engine to detect the sparse data within content to be indexed via determination that the content matches one or more classification rules. The classification rules may be built-in to a classification engine or may be user-defined, and, in some examples, a number of matches and a confidence of the matches for the one or more classification rules may be determined.

As previously discussed, the sparse data may include a data point related to an entity. Once detected, the classification engine may be further configured to create an integer array for the data point to store within the search index. The integer array may include an identifier of the entity and a value associated with the data point, where the value may include a count and/or confidence value based on the determined number and/or confidence of the matches. A highest n-bits of the integer array may include the identifier of the entity, and the lowest m-bits of the integer array may include the value. In some examples, for each integer array, the integers may be 64-bits, with 32-bits for the identifier of the entity and 32-bits for the value associated with the data point.

The integer array may be stored within a single column added to the search index, where the single column may also store multiple other integer arrays created for one or more other data points of the sparse data related to one or more other entities. The addition of only one column for multiple entities (as opposed to existing implementation of two columns per each entity) may help prevent any potential negative impact on the capacity and performance of the system. Furthermore, due to the detection process executed prior to creation of the integer arrays, only entities with sparse data may be included in the integer arrays.

At least another one of the servers of the datacenter 102 may be configured to execute a query engine. In response to receiving a request from a user to perform a query on the search index that includes at least one data point of the sparse data, the query may be transformed to a corresponding range based on the identifier of the entity included in the highest n-bits of the integer array. Upon execution of the query, query results may be provided to the user. In some examples, the identifier of the entity may be removed from the highest n-bits of each integer array prior to being provided, and at least one additional array may be provided with user-compatible identifiers for the entity such that the user may be able to understand the query results.

Figure 2:
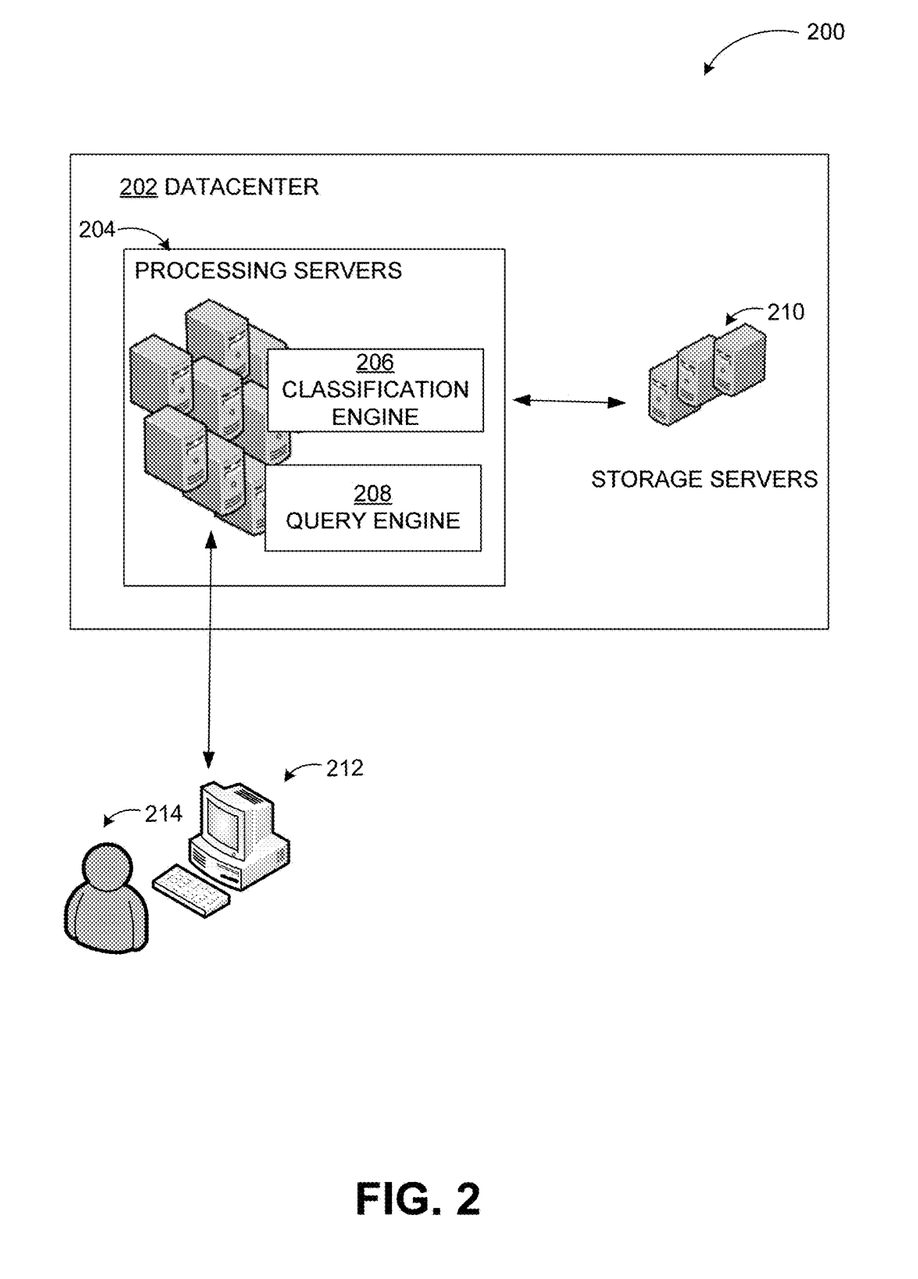
FIG. 2 illustrates a conceptual system, where storage of related sparse data within a search index may be implemented, according to some embodiments.

FIG. 2 illustrates a conceptual system, where storage of related sparse data within a search index may be implemented, according to some embodiments. An example system may include a datacenter 202 hosting a cloud application that processes/stores data. Search indices may be created for the data such that it may be queried by one or more users, and in some cases, the data to be indexed may be sparse, such as sensitive data or data associated with a spreadsheet application including expense reports and/or inventory sheets, for example.

As illustrated in diagram 200, a datacenter 202 may include one or more processing servers 204 configured to execute a classification engine 206 and a query engine 208, for detecting/classifying sparse data for storage and executing queries on the stored data. Stored data may be managed by the processing servers 204 or by dedicated data storage servers (e.g., database servers) 210. In some embodiments, the datacenter 202 may also include a communication module to facilitate data transfer between the servers (204, 210) of the datacenter 202 and one or more client devices (212) associated with the datacenter 202.

In an example scenario, the processing servers 204 may receive content to be processed/stored through a client device 212 associated with a user 214, where the content may include sparse data comprising at least one data point related to an entity. In one example, the sparse data may be sensitive data such that the entity includes one of credit card information, social security information, passport information, identification information, and account information, among other sensitive information. The data point related to the entity may be detected by the classification engine 206 in response to a determination that the content matches one or more classification rules, where the classification rules may be built-in to the classification engine 206 or may be defined by the user 214. In some examples, a number of matches and a confidence of the matches for the classification rules may be determined.

The processing servers 204 may index the processed/stored data to allow the data to be queriable by the user 214. To index the sparse data without generating large data structures (for example, the two columns for each entity created in existing implementations), the classification engine 206 may create an integer (or string) array for the data point to store within the search index. The integer array may include an identifier of the entity and a value associated with the data point, where the value associated with the data point may include a count and/or confidence value corresponding to the determined number and/or confidence of the matches. A highest n-bits of the integer array may include the identifier of the entity, and the lowest m-bits of the integer array may include the value. The integer array created for the data point may be stored within a single column added to the search index.

In response to receiving a request from the user 214 to perform a query on the search index that includes the data point, the query engine 208 may transform the query to a corresponding range based on the identifier of the entity included in the highest n-bits of the integer array. Upon execution of the query, query results may be provided to the user 214 through the client device 212 associated with the user 214. In some examples, the identifier of the entity may be removed from the integer array prior to being provided and at least one additional array may be provided with user-compatible identifiers for the entity such that the user 214 may be able to understand the query results.

In another example scenario, the content received to be processed/stored through the client device 212 associated with a user 214 may include sparse data comprising at least one data point related to an entity, where the sparse data may be data associated with an expense report. The entity may include an expense category, such as lodging, food, and travel, and each category may have one or more associated properties, such as an expenditure amount and a number of expenditures, for example. Similar to the above described embodiments, the classification engine 206 may create an integer array for the data point to store within the search index. The integer array may include an identifier of the entity, such as lodging, food, and travel, and a value associated with the data point, where the value associated with the data point may include a value based on the expenditure amount or the number of expenditures, for example. The integer array created for the data point may be stored within a single column added to the search index.

Figure 3:
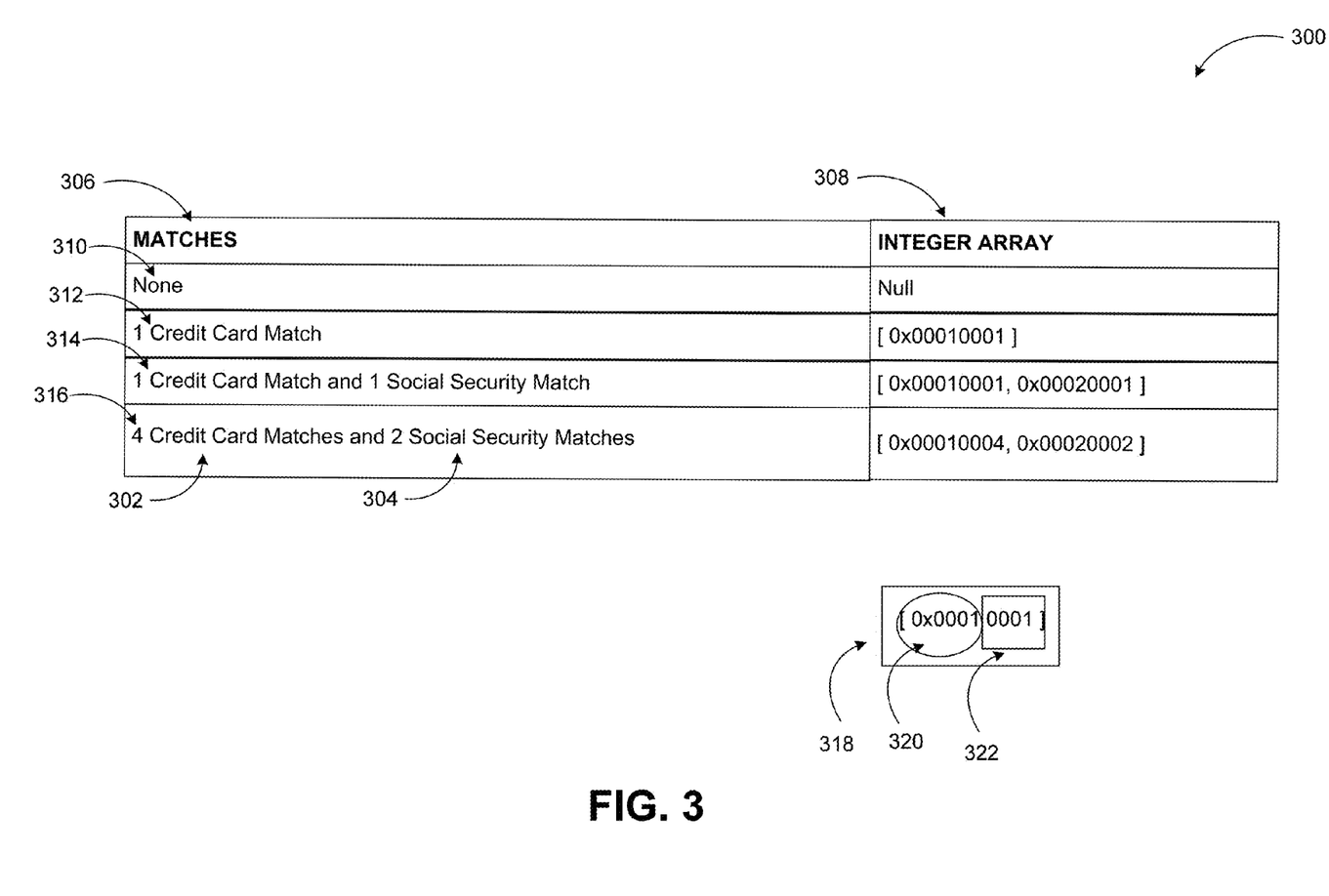
FIG. 3 illustrates examples of integer arrays created to index related sparse data.

FIG. 3 illustrates examples of integer arrays created to index related sparse data, according to some embodiments.

In an example scenario, content to be indexed may be scanned by a classification engine to detect sparse data and/or sensitive data comprising one or more data points each related to an entity, such as a credit card entity 302 and a social security entity 304. The sparse and/or sensitive data may be detected by determining if the content matches one or more classification rules. The classification rules may be default rules that are built-in to the classification engine, and/or users may be enabled to define custom classification rules. When scanning content, the classification engine may determine how many matches exist and a confidence of the matches for a given rule, which may provide count and/or confidence data associated with the data point related to the entity. In common implementations, between 1% and 2% of the search index content may have a match to classification rules (i.e., between 1% and 2% of the search index content includes sparse and/or sensitive data), and for those, the sparse and/or sensitive data may only be related to a few entities within the search index, such as the credit card entity 302 or the social security entity 304.

According to embodiments, an integer array may be created for each data point related to an entity upon detection of the sparse and/or sensitive data within the content to be indexed. As illustrated by a match count column 306 and an integer array column 308 of the displayed table in diagram 300, the integer array for the data point may be created based on the related entity and the determined number of matches. In other embodiments, the integer array for a data point may be created based additionally on the determined confidence of the matches. An example integer array 318 may include two elements, where a highest n-bits 320 of the integer array may be a unique identifier for the entity, and a lowest m-bits 322 may be a value associated with the data point, where the value may be a count or a confidence value, for example. In some embodiments, the integer array may be 32 bits, with the highest 16 bits being the identifier for the entity and the lowest 16 bits being the value associated with the data point.

As displayed in the table, the identifier for the credit card entity 302 may be 0x0001 and the identifier for the social security entity 304 may be 0x0002. If the classification engine determines that there are no matches in the content to be indexed, and thus there is no sparse and/or sensitive data, no integer array may be created as illustrated in a first row 310 of the table. If the classification engine determines there is one match in the content to be indexed related to the credit card entity 302, an integer array, [0x00010001], may be created as illustrated in a second row 312 of the table. The highest n-bits may be the identifier for the entity, 0x0001, and the lowest m-bits may be the value associated with the data point, 0001, indicating the one match. If the classification engine determines there is one match in the content to be indexed related to the credit card entity 302, and one match in the content to be indexed related to the social security entity 304, an integer array, [0x00010001, 0x00020001] may be created as illustrated in a third row 314 of the table. The highest 32-bits may be the identifier for the entities, 0x0001 and 0x0002, and the lowest 32-bits may be the value associated with the data points, 0001 and 0001, indicating the one match for each entity. If the classification engine determines there are four matches in the content to be indexed related to the credit card entity 302, and two matches in the content to be indexed related to the social security entity 304, an integer array, [0x00010004, 0x00020002] may be created as illustrated in the fourth row 316 of the table. The highest 32-bits may be the identifier for the entities, 0x0001 and 0x0002, and the lowest 32-bits may the value associated with the data points, 0004 and 0002, indicating the four matches related to the credit card entity 302 and the two matches related to the social security entity 304, respectively. While integers are used in the examples herein, embodiments may also be implemented with strings.

For query execution, a user may transmit a request to perform a query to a query engine, where the request may include an entity and a data point they wish to refine the query with. In some embodiments, the users may query the search index using count and confidence data. For example, a user may be able to query on the search index for the following items:

Items with Credit Card Numbers

Items with at least 5 Credit Card Numbers

Items with Credit Card Numbers and Social Security Numbers

Items with Credit Card Numbers and a confidence of at least 80%

Items with any classification matches

In an example scenario, if a user requests to search for items with exactly 5 pieces of credit card data, then they may need to search for items with an integer array that has the identifier of the credit card entity 302 and a (count) value of 5, or 0x00010005. The query may become slightly more complicated when looking for items greater than 5, as the upper limit of credit card count may need to be considered. In this scenario, the value may need to be greater than 0x00010005, and less than or equal to 0x0001FFFF. For determining if an item contains any matches for an entity, the presence of any number paired with the entity key may indicate a match (for the above example, there may be a credit card match if there is a number greater than 0x00010000 and less than or equal to 0x0001FFFF).

An example implementation may ensure that the user is insulated from the implementation (that is, the user does not know anything about the entity codes used with the highest n-bits) to protect sensitive data and its source. Therefore, prior to providing query results to the user, the highest n-bits that represent the identifier of the entity may be removed so that the numbers returned can be understood by the user. Secondly, since the user may have an array of numbers and not understand what they mean, another array may be provided to the user with user friendly identifiers for the entities with the same index as the integer array.

According to other embodiments, if a user requests to perform a query on a single data point, the data for the single data point may be returned. For example, only an item that matches the identifier of the entity may be provided in the query results to the user, again, with the highest n-bits removed. If there is no matching value, then 0 may be returned.

Figure 4:
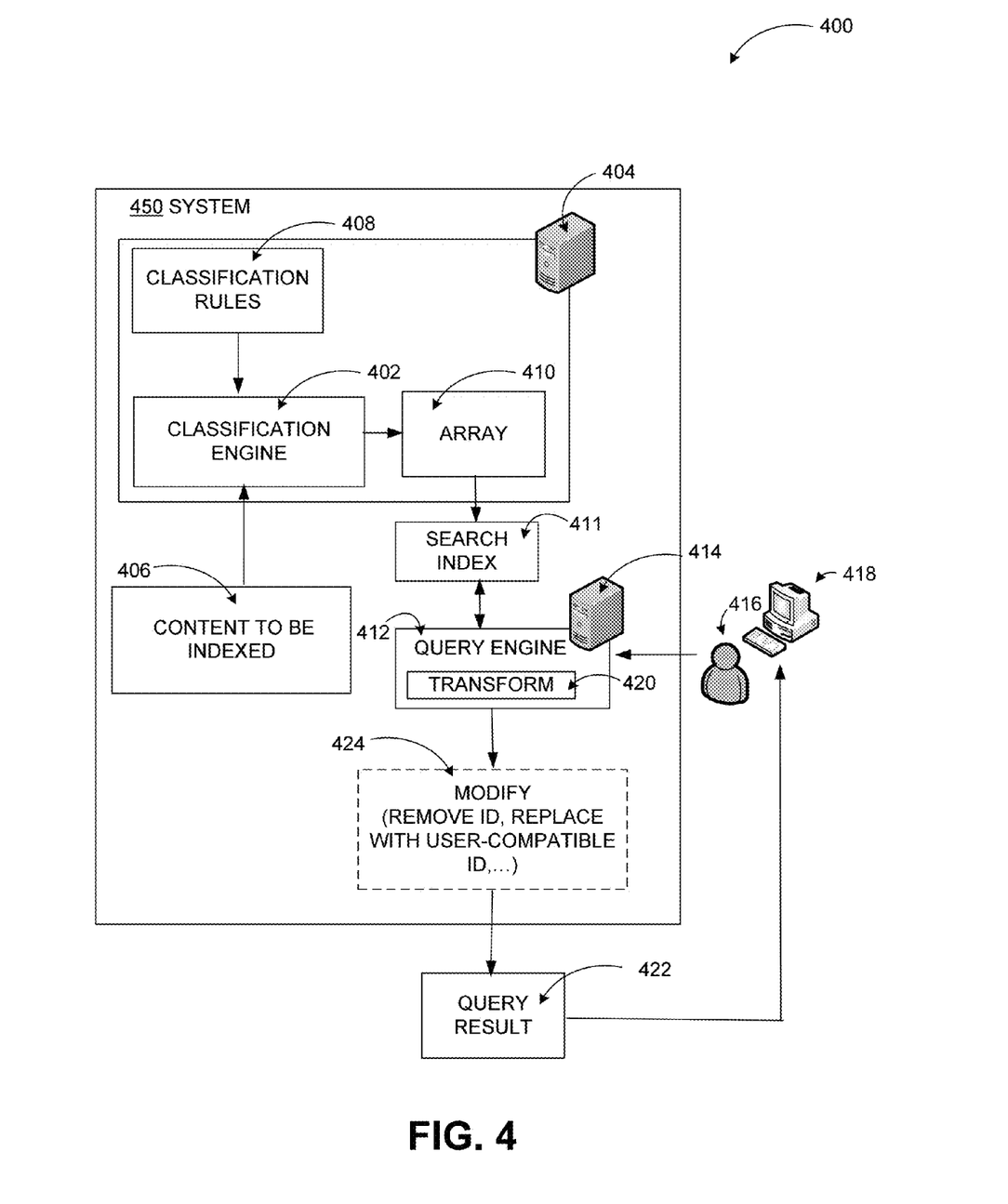
FIG. 4 illustrates an example block diagram of a system configured to create an integer array to index related sparse data.

FIG. 4 illustrates an example block diagram of a system configured to create an integer array to index related sparse data, according to embodiments.

As illustrated in diagram 400, within an example system 450, search indices may be created for system data such that it may be queried by a user 416, and in some cases, the data to be indexed may be sparse, such as sensitive data. A classification engine 402, integrated with a search engine or application executed by a server 404, may detect the sparse and/or sensitive data comprising one or more data points related to a number of entities within content to be indexed 406. A data point related to an entity may be detected via determination that content to be indexed 406 matches one or more classification rules 408, where the classification rules may be built-in to a classification engine or may be user-defined. In some examples, a number of matches and a confidence of the matches for the one or more classification rules may be determined.

Once detected, the classification engine 402 may be further configured to create an integer array 410 for the data point to store within a search index 411 instead of creating a potentially very large data structure that includes a column for each type of data point related to an entity. The integer array may include an identifier of the entity and a value associated with the data point, where the value may indicate a count and/or confidence value based on the number and/or confidence of the matches determined by the classification engine 402. A highest n-bits of the integer array 410 may include the identifier of the entity, and the lowest m-bits of the integer array 410 may include the value.

A query engine 412, executed by another server 414, may receive a request from a user 416 through a client device 418 associated with the user 416 to perform a query on the search index 411, where the request may include an entity and a data point to refine the query. In some examples, the user 416 may search for a data point using count and/or confidence data. For example, the user 416 may be able to search for items with credit card numbers, items with at least 5 credit card numbers, items with credit card numbers and social security numbers, items with credit card numbers and a confidence of at least 80%, and items with any classification matches, among other examples. In response to receiving the request from the user 416, the query may be transformed 420 to a corresponding range based on the identifier of the entity included in the highest n-bits of the integer array 410. Upon execution of the query, query results 422 may be provided to the user 416. In some embodiments, the query results 422 may be modified 424 prior to being provided to the user 416. For example, the identifier of the entity may be removed from the highest n-bits of each integer array 410 prior to being provided, and at least one additional array may be provided with user-compatible identifiers for the entity such that the user 416 may be able to understand the query results 422.

The examples in FIG. 1 through 4 have been described with specific platforms including datacenters, systems, servers, applications, and interactions. Embodiments are not limited to systems according to these example configurations. Efficient storage of related sparse data in a search index may be implemented in configurations using other types of platforms including datacenters, systems, servers, applications, and interactions in a similar manner using the principles described herein.

Sparse data may be stored in a search index such that one or more data points related to a number of entities may be queriable. Upon detection of a data point related to an entity, an integer array may be created for the data point to store within a single column of the search index. The addition of only one column for multiple entities (as opposed to existing implementation of two columns per each entity) may advantageously reduce a memory space required, and help prevent any potential negative impact on the capacity and performance of the system. Additionally, due to the detection process executed prior to creation of the integer arrays, only entities with sparse data may be included in the integer arrays further reducing a memory space required.

In response to receiving a request from a user to perform a query on the search index that includes the data point, the query may be transformed to a corresponding range based on the identifier of the entity. Upon execution of the query, the identifier may be removed and query results may be provided to the user as another array with a user-compatible identifier for the entity such that the results may be understood by the user, which may advantageously improve usability.

Figure 5:
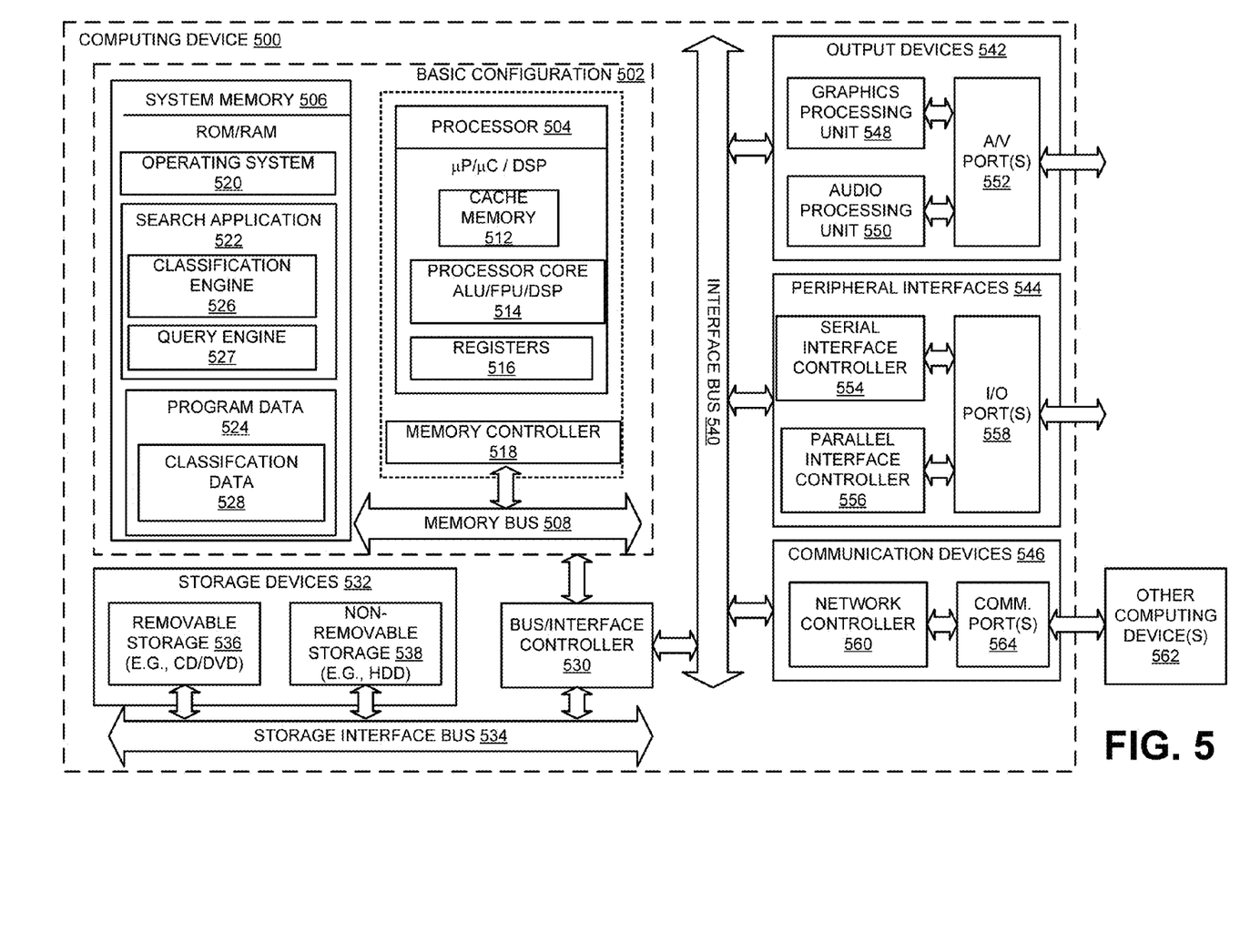
FIG. 5 is a block diagram of an example general purpose computing device, which may be used for storage of related sparse data within a search index.

FIG. 5 and the associated discussion are intended to provide a brief, general description of a general purpose computing device, which may be used for efficient storage of related sparse data in a search index, arranged in accordance with at least some embodiments described herein.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a search application 522, a classification engine 526, a query engine 527, and program data 524. The search application 522 may receive content to be indexed, and execute the classification engine 526, where the classification engine 526 may be configured to detect sparse data comprising a data point related to an entity within the content. The sparse data may be detected by determining if the content matches one or more classification rules. The classification engine 526 may create an integer array for the data point to store in the search index, each integer array including an identifier for the entity and a value associated with the data point. The search application 522 may then be configured to execute a query engine 527 in response to receiving a request from a user to perform a query on the search index that includes the data point, the request including the entity and the data point to refine the query. The query engine 527 may transform the query based on the identifier of the entity, execute the query, and provide query results to the user. Program data 524 may include, among other things, classification data 528 related to count and confidence data based on a number of matches and a confidence of the matches determined by the classification engine 526.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to store related sparse data within a search index. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
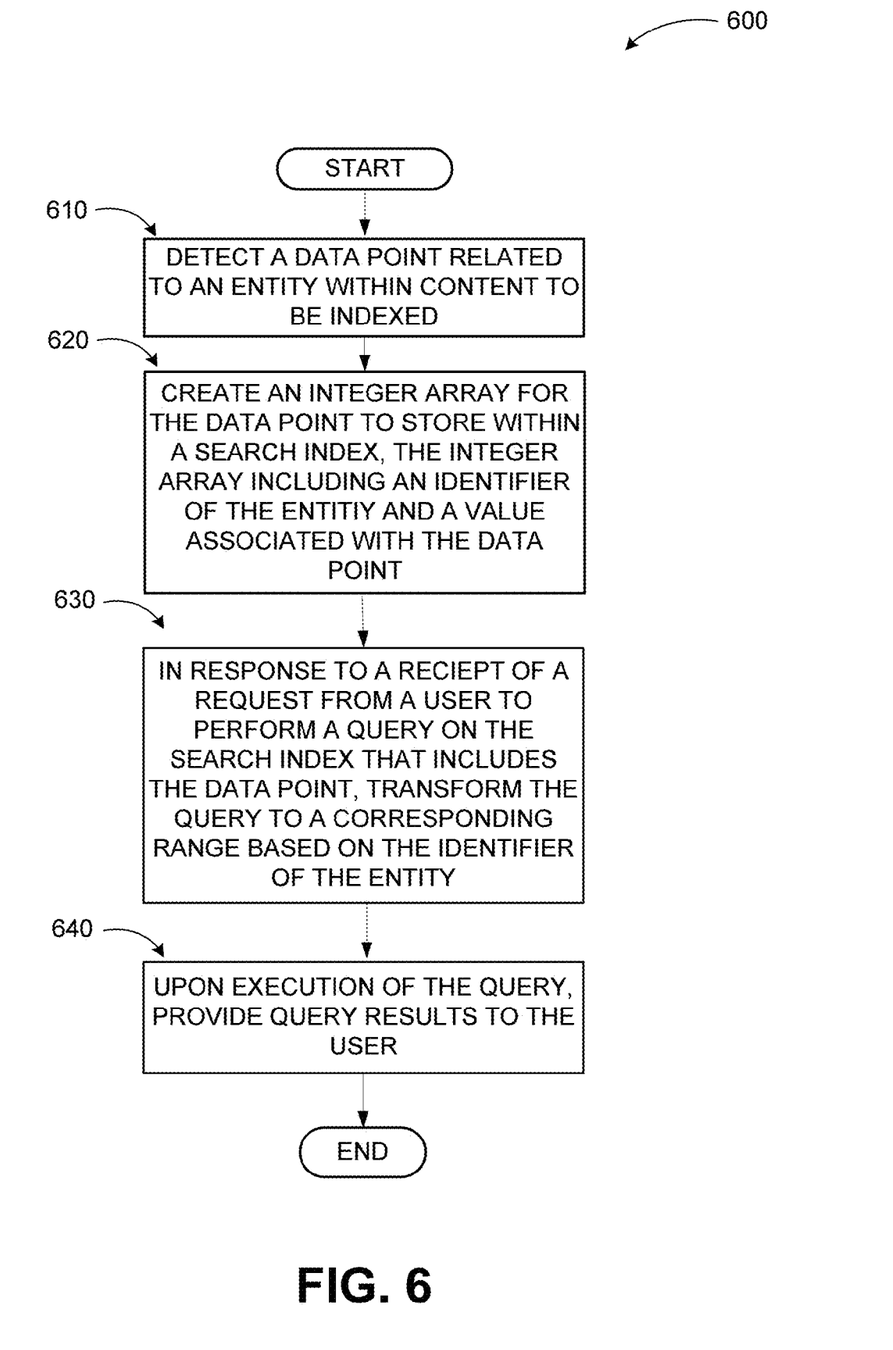
FIG. 6 illustrates a logic flow diagram of a method for storage of related sparse data within a search index, according to embodiments.

FIG. 6 illustrates a logic flow diagram for process 600 of a method for efficient storage of related sparse data in a search index, according to embodiments. Process 600 may be implemented on a server or other system.

Process 600 begins with operation 610, where sparse data comprising a data point related to an entity may be detected via determination that content to be indexed matches one or more classification rules. In some examples, a number of matches and a confidence of the matches for the one or more classification rules may be determined.

At operation 620, an integer array may be created for the data point to store within the search index. The integer array may include an identifier of the entity and a value associated with the data point, where the value may be a count and/or confidence value based on the determined number and/or confidence of the matches, respectively. A highest n-bits of the integer array may include the identifier, and the lowest m-bits of the integer array may include the value, for example. The integer array may be stored within a single column added to the search index, where the single column may also store multiple other integer arrays created for one or more data points of the sparse data related to one or more other entities.

At operation 630, a request from a user to perform a query on the search index that includes at least one data point of the sparse data may be received, and in response to the request, the query may be transformed to a corresponding range based on the identifier of the entity included in the highest n-bits of the integer array. At operation 640, query results may be provided to the user upon execution of the query. In some examples, the identifier of the entity may be removed from each integer array prior to being provided, and at least one additional array may be provided with user-compatible identifiers for the entity such that the user may be able to understand the query results.

The operations included in process 600 are for illustration purposes. Efficient storage of related sparse data in a search index may be implemented by similar processes with fewer or additional steps, as well as in different order of operations using the principles described herein.

According to some embodiments, a method to store related sparse data within a search index may be provided. An example method may include a means for detecting sparse data within content to be indexed, the sparse data comprising a data point related to an entity, and a means for creating an integer array for the data point to store within the search index, the integer array comprising an identifier of the entity and a value associated with the data point. The example method may also include a means for transforming the query to a corresponding range based on the identifier of the entity in response to receiving a request from a user to perform a query on the search index that includes the data point, and upon execution of the query, a means for providing query results to the user.

According to some examples, methods to store related sparse data within a search index may be provided. An example method may include detecting sparse data within content to be indexed, the sparse data comprising a data point related to an entity, and creating an integer array for the data point to store within the search index, the integer array comprising an identifier of the entity and a value associated with the data point. The example method may also include transforming the query to a corresponding range based on the identifier of the entity in response to receiving a request from a user to perform a query on the search index that includes the data point, and upon execution of the query, providing query results to the user.

In other examples, an identifier of the entity may be removed prior to providing the query results to the user. The query results may be provided as another array with a user compatible identifier for the entity, where the other array may have a same index as the integer array. The identifier may correspond to a highest n-bits of the integer array. The value may correspond to a lowest m-bits of the integer array.

In further examples, detection of the sparse data within the content to be indexed may include determining if the content to be indexed matches one or more classification rules. A number of matches and a confidence of the matches may be determined for the one or more classification rules. In response to a determination that there is at least one match, the integer array may be created for the data point such that the value associated with the data point is one or more of a count value and a confidence value based on the determined number and confidence of the matches. The integer array may be stored within a single column of the search index.

According to some embodiments, systems configured to store related sparse data within a search index may be described. An example system may include a communication module configured to transmit data between one or more servers of the system and one or more client devices associated with the system. The example system may also include at least one server executing a classification engine, where the classification engine may be configured to determine if content to be indexed matches one or more classification rules to detect sparse data within the content, the sparse data comprising a data point related to an entity, and create an integer array for the data point to store within a column of the search index, the integer array comprising an identifier of the entity and a value associated with the data point. The example system may further include at least one other server executing a query engine and coupled to the at least one server through the communication module, where the query engine configured to transform a query to a corresponding range based on the identifier of the entity in response to a receipt of a request from a user to perform a query on the search index that includes the data point, and upon execution of the query, provide query results to the user.

In other embodiments, the one or more classification rules may be default rules of the classification engine and/or user-defined. The classification engine may be configured to determine a number of matches and a confidence of the matches for the classification rules. The value associated with the data point may be a count value and/or a confidence value based on the determined number and confidence of the matches. The user may be enabled to refine the query using the number of the matches and the confidence of the matches determined for the classification rules.

In further embodiments, the request to perform the query may include the entity and the data point. The sparse data may be sensitive data.

According to some examples, computer-readable memory devices with instructions stored thereon to store related sparse data within a search index may be described. Example instructions may include detecting sensitive data within content to be indexed, the sensitive data comprising a data point related to an entity, and creating an integer array for the data point to store within a column of the search index, the integer array comprising an identifier of the entity and a value associated with the data point. The example instructions may also include transforming the query to a corresponding range based on the identifier of the entity in response to receiving a request from a user to perform a query on the search index that includes the data point, and upon execution of the query removing the identifier of the entity from the integer array and providing query results to the user as another array with a user compatible identifier for the entity.

In other examples, the entity may include a credit card number, a social security number, a passport number, an identification number, or account number. The data point may include an integer type that supports standard integer operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to store related sparse data within a search index, the method comprising:
   detecting sparse data within content to be indexed, the sparse data comprising a data point related to an entity by determining if the content matches one or more classification rules;
   determining a number of matches and a confidence of the matches for the one or more classification rules;
   in response to a determination that there is at least one match, creating an integer array for the data point such that a value associated with the data point is one or more of a count value and a confidence value based on the determined number and confidence of the matches;
   in response to receiving a request from a user to perform a query on the search index that includes the data point, transforming the query to a corresponding range based on an identifier of the entity; and
   upon execution of the query, providing query results to the user.

2. The method of claim 1, further comprising:
   removing the identifier of the entity prior to providing the query results to the user.

3. The method of claim 1, wherein providing the query results to the user further comprises:
   providing the query results as another array with a user compatible identifier for the entity.

4. The method of claim 3, wherein the other array has a same index as the integer array.

5. The method of claim 1, wherein the identifier corresponds to a highest n-bits of the integer array.

6. The method of claim 1, wherein the value corresponds to a lowest m-bits of the integer array.

7. The method of claim 1, further comprising:
   storing the integer array within a single column of the search index.

8. A system configured to store related sparse data within a search index, the system comprising:
   a communication module configured to transmit data between one or more servers of the system and one or more client devices associated with the system; and
   at least one server comprising:
      a memory; and
      a processor coupled to the memory and the communication interface, the processor configured to execute a search application, wherein the search application is configured to execute a classification engine and a query engine, wherein the classification engine is configured to:
         determine if content to be indexed matches one or more classification rules to detect sparse data within the content, the sparse data comprising a data point related to an entity
         determine a number of matches and a confidence of the matches for the one or more classification rules; and
         in response to a determination that there is at least one match, creating an inter array for the data point such that a value associated with the data point is one or more of a count value and a confidence value based on the determined number and confidence of the matches; and
      the query engine is configured to:
         transform a query to a corresponding range based on an identifier of the entity in response to a receipt of a request from a user to perform a query on the search index that includes the data point; and
         upon execution of the query, provide query results to the user.

9. The system of claim 8, wherein the one or more classification rules are one of default rules of the classification engine and user-defined.

10. The system of claim 8, wherein the user is enabled to refine the query using the number of the matches and the confidence of the matches determined for the one or more classification rules.

11. The system of claim 8, wherein the request to perform the query includes the entity and the data point.

12. The system of claim 8, wherein the sparse data is sensitive data.

13. A hardware computer-readable memory device with instructions stored thereon to store related sparse data within a search index, the instructions comprising:

detecting sensitive data within content to be indexed, the sensitive data comprising a data point related to an entity by determining if the content matches one or more classification rules;

determining a number of matches and a confidence of the matches for the one or more classification rules;

in response to a determination that there is at least one match, creating an integer array for the data point such that a value associated with the data point is one or more of a count value and a confidence value based on the determined number and confidence of the matches;

in response to receiving a request from a user to perform a query on the search index that includes the data point, transforming the query to a corresponding range based on an identifier of the entity; and upon execution of the query:
  removing the identifier of the entity from the integer array; and
  providing query results to the user as another array with a user compatible identifier for the entity.

14. The hardware computer-readable memory device of claim 13, wherein the entity includes one of a credit card number, a social security number, a passport number, an identification number, and account number.

15. The hardware computer-readable memory device of claim 13, wherein the data point includes an integer type that supports standard integer operations.

* * * * *